April 14, 1970 A. C. HOWELL, JR 3,506,099
CONDUCTOR BARS FOR TROLLEY SYSTEMS
Filed Jan. 18, 1968 2 Sheets-Sheet 1
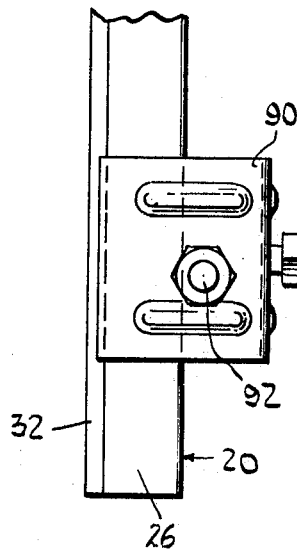
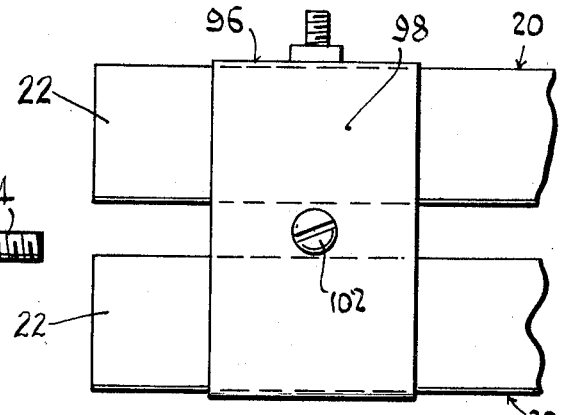
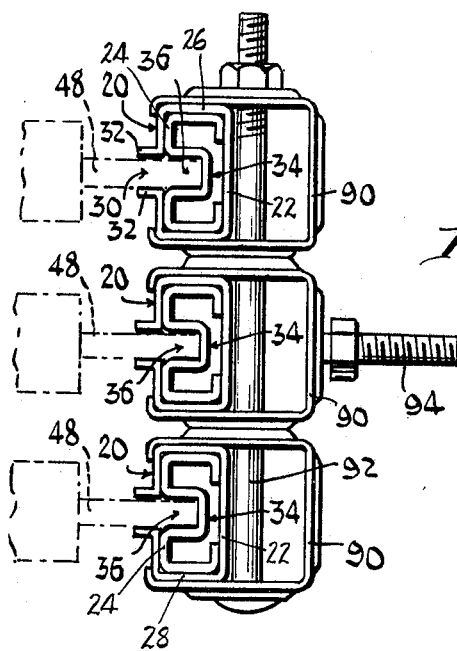
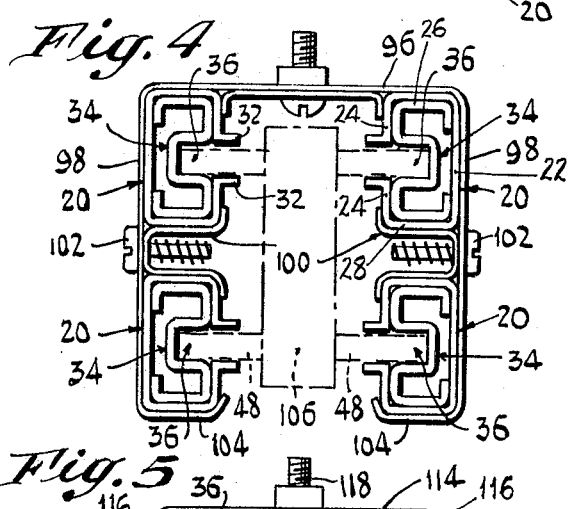
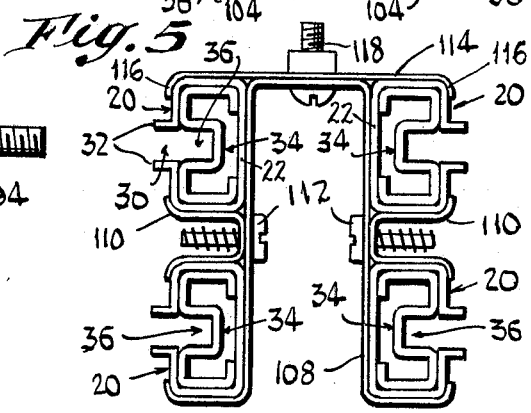
INVENTOR.
Alleyne C. Howell, Jr.
BY
AGENT

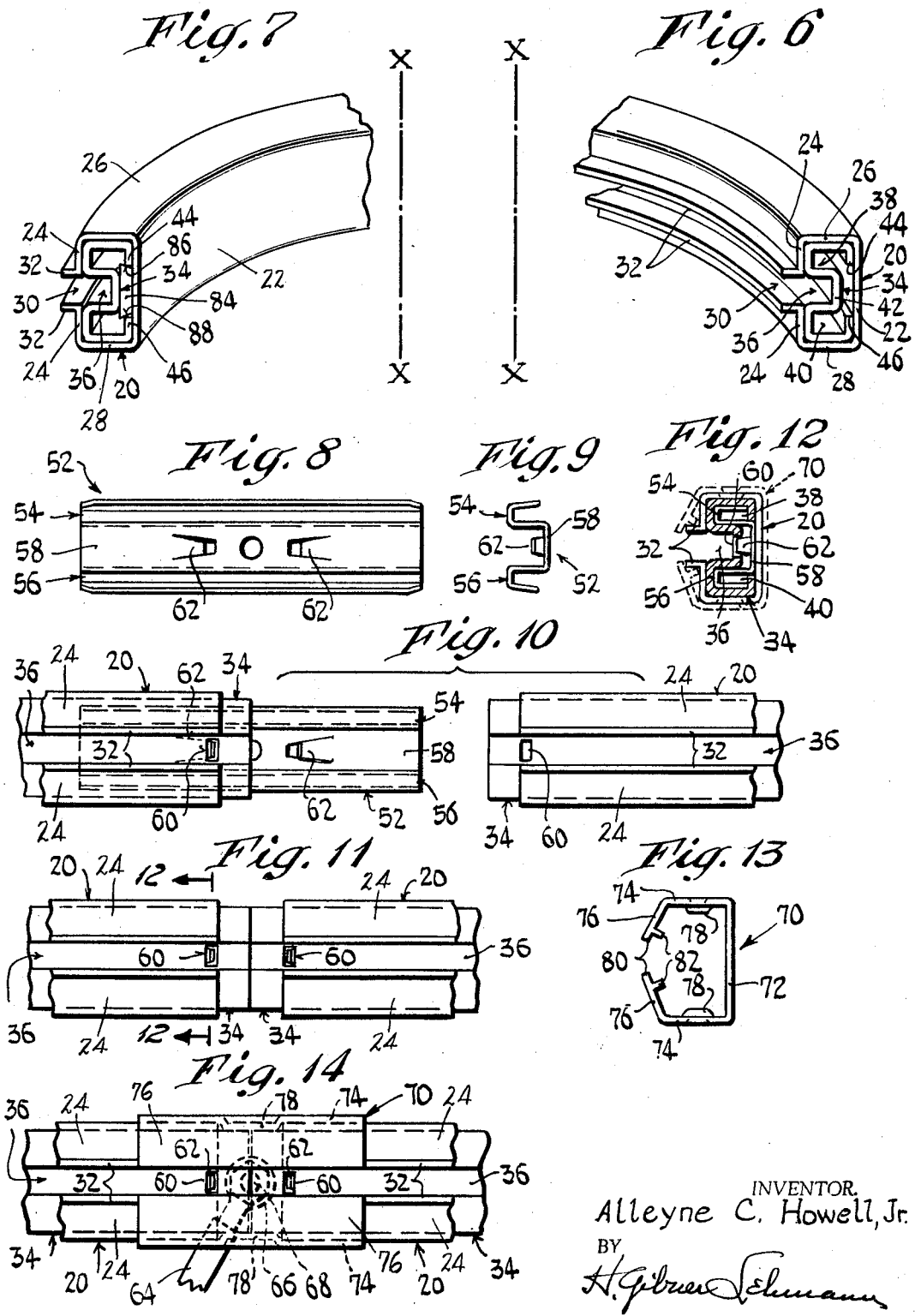

United States Patent Office 3,506,099
Patented Apr. 14, 1970

3,506,099
CONDUCTOR BARS FOR TROLLEY SYSTEMS
Alleyne C. Howell, Jr., Fairfield, Conn. (% Howell Corporation, 470 Surf Ave., Stratford, Conn. 06497)
Filed Jan. 18, 1968, Ser. No. 698,793
Int. Cl. B60m 1/34
U.S. Cl. 191—23                           15 Claims

ABSTRACT OF THE DISCLOSURE

A conductor bar assemblage for carrying electricity to a trolley consisting of a formed sheet metal conductor closely fitting within an insulating jacket. The jacket has a rectangular cross section with a longitudinal slot along one broad side. The conductor has a rectangular groove which concides with the jacket slot and receives a collector shoe.

CROSS REFERENCES

The following patents represent a fair cross-section of the prior art to which the invention pertains: U.S. Patents Nos. 457,105; 490,297; 532,796; 2,304,720; 2,422,-132; 2,835,752; 3,144,508 and 3,303,293.

BACKGROUND

This invention relates to formed metal electrical conductor bar assemblages for trolley systems of monorails, cranes, hoists and the like, said assemblages comprising formed metal sections constituting rails or tracks engaged by the collector shoe of a current-collecting head to supply electrical energy to a motor or other device.

Heretofore, conductor bars of formed metal sections were mostly so constituted that only a single contacting surface of the collector shoe had effective conducting relationship with the bar or track. This was particularly true where the track was curved, regardless of entry in a vertical direction or horizontal direction, i.e. top or bottom entry, or else side entry. If there was a dirty environment, the collection of dirt from such environment or from other causes at any point on the track could cause arcing, pitting and general malfunctioning, as well as damage which often resulted in replacement and servicing being necessary.

Besides the foregoing disadvantage, there was sometimes in addition a limitation on the bending or curving of the formed metal of the conductor bars. In prior constructions the effect of bending to enable the track to follow a curved path resulted in undesirable twist, which then gave rise to poor or discontinuous contact, local heating, arcing and the like. Prior conductor bars of formed metal which could twist or distort were also of limited utility when used in multiples, since triple or quadruple bar assemblies of prior design were not adaptable to all situations requiring absolute reliability of conduction and flexibility or adaptability to meet curved-track requirements.

SUMMARY

The above drawbacks and disadvantages of prior conductor bar assemblages constituted of formed metal sections are obviated by the present invention, and one object of the invention is to provide a novel and improved conductor track or bar having a formed metal section, which provides plural-sided or multiple, especially reliable conduction to the collector shoe, and which additionally may be readily curved about various axes, either singly or stacked in multiples, while yet effecting a maximum degree of continuity of conduction, even under adverse environments and conditions of use. This is accomplished by the provision of an assemblage comprising an outer insulating, substantially tubular jacket member having a central longitudinal slot in one of two opposite, broad sides. Snugly fitted in the slotted jacket is a formed metal conductor or track member which also has a configuration generally presenting pairs of opposite broad and narrow sides engaged with the corresponding sides of the jacket.

The metal conductor member has a significantly deep central longitudinal groove in one broad side, registered with the slot of the jacket to thereby receive a current collector shoe. The deep groove of the conductor member has opposed side contractor walls which are commensurate in width with the bottom contractor wall, all said walls being arranged so that at any time two of the three walls (always including the bottom wall) can make good electrical contact with the collector shoe. In conjunction with such organization, the edges of the insulating jacket which constitute the slot thereof and which adjoin the groove of the metal inner conductor are set back, so to speak, so that they do not engage or interfere with the collector shoe. Moreover, the configuration of the assemblage enables it to be readily bent or curved without appreciable or significant distortion, or impairment of the electrical conduction. By virtue of the groove of the conductor member having three surfaces which are engageable with the collector shoe, there is insured continuity of engagement and contact to the greatest possible extent. Two of the surfaces are vertically spaced apart and extend substantially horizontally so as to be engageable with upper or lower side surfaces of the shoe. The third or bottom groove surface extends substantially vertically and is engageable with an end or edge surface of the collector shoe. The configuration of the inner, conducting member is such that it can clamp against and retain an auxiliary current-carrying strip, making effective contact therewith along its entire length, thus providing for added current-carrying capacity when this is necessary. No change in the inner member is necessary to accommodate the auxiliary current carrier.

Other objects and advantages of the invention reside in an improved conductor bar as above set forth, which is simple in construction and economical to fabricate; an improved conductor bar that is reliable in its operation in consequence of being sturdy and rugged whereby it will withstand adverse conditions of use without experiencing breakdown or appreciable wear, thus requiring a minimum amount of servicing; and a conductor bar intended for horizontal insertion of the collector shoe, which bar is readily adaptable to suit a wide variety of requirements, including stacking in groups or multiples that involve dual, triple or quadruple rails or conductors arranged in an extremely compact configuration taking up a minimum amount of space.

Other features and advantages will hereinafter appear.

In the drawings:

FIG. 1 is a fragmentary top plan view of a stack of three conductor bars as provided by the invention.

FIG. 2 is an end elevational view of the triple-stacked conductor bars of FIG. 1.

FIG. 3 is a fragmentary side elevational view of an assemblage of four conductor bars made according to the invention, arranged to have the collector shoes disposed within the assemblage.

FIG. 4 is an end elevational view of the assemblage of four bars of FIG. 3.

FIG. 5 is an end elevational view of the assemblage of the view of FIG. 4) of a group of four conductor bars, arranged however in a different assemblage wherein the collector shoes travel along opposite outer sides of the assemblage.

FIG. 6 is a fragmentary perspective view of one collector bar, showing the manner in which the bar can be curved to enable the equipment energized thereby to traverse a curved path.

FIG. 7 is a fragmentary perspective view of a single collector bar somewhat like that of FIG. 6, showing an opposite curving of the bar and also illustrating an auxiliary current-carrying member.

FIG. 8 is a side elevational view of a connector fitting adapted to join together the ends of two conductor bars.

FIG. 9 is an end elevational view of the connector fitting of FIG. 8.

FIG. 10 is a fragmentary exploded view illustrating the connector fitting of FIGS. 8 and 9, attached to the end of one conductor bar with the adjoining end of the next conductor bar in readiness for securement, to form a joint.

FIG. 11 is a fragmentary side elevational view of a completed or assembled joint as disposed at the adjoining ends of two conductor bars.

FIG. 12 is a vertical sectional view, taken on the line 12—12 of FIG. 11.

FIG. 13 is an end elevational view of a cover piece for use with the joint of FIGS. 11 and 12.

FIG. 14 is a side elevational view of the completed joint including the cover piece of FIG. 13.

The novel assemblages of FIGS. 1–5 illustrate multiples or stacking of individual conductor bars of the unique kind provided by the invention. A description of one such conductor bar will first be given, reference being had particularly to FIG. 6. While this figure illustrates a bar which has been curved or bent, it will be understood that such bar could as well be straight and that it was initially formed as a straight length, being normally provided in ten-foot long sections or strips.

The single conductor bar shown in FIG. 6 comprises a generally tubular outer member or jacket 20 of insulating material such as polyvinyl chloride or the like, constituted as a semi-closed elongate hollow strip having a pair of essentially broader, mutually opposite upper and lower sides 26, 28.

The outer member or jacket 20 is provided with a continuous longitudinal slot 30 which extends centrally along the broad side 24, said slot being preferably formed to have thickened edges by the provision of outwardly projecting longitudinal beads 32. The conductor bar section further comprises an elongate inner electrically conducting member 34 of metal, disposed in and fitted to the jacket 20 and, in accordance with the invention, having a significantly deep longitudinal groove 36 which is aligned with the slot 30 of the jacket. The outer and inner members of the bar have cross-sectional shapes of substantially elongate or rectangular configuration, with the narrower and broader surfaces of the inner member respectively juxtaposed to and extending along the narrower and broader surfaces or sides of the outer member. Thus, the assembled outer and inner members are closely fitted to each other, and by this invention the grooving and elongate cross sectional shapes of such members enable them to be readily flexed or curved about various vertical axes, such as the axis X—X illustrated in FIGS. 6 and 7, with the slot 30 and groove 36 remaining in a horizontal plane. Such axis is seen to be normal to the inner and outer members and also normal to the narrower sides 26, 28 of the outer member or jacket 20.

The deep groove 36 of the inner, metal conducting member 34 has upper and lower, opposed side contactor walls which are commensurate in width with the bottom contactor wall 42, and either the upper side wall or the lower side wall can conductively and effectively engage the collector shoe simultaneously with its engagement with the bottom wall 42 whereby appreciable current can be handled by both. In accomplishing this, the member 34 comprises two spaced-apart parallel substantially tubular portions 38, 40 and an integral connecting web portion constituting the wall 42 and extending between and joining the tubular portions 38, 40. The space between the tubular portions thus comprises the deep longitudinal groove 36 of the inner member 34. Preferably, as illustrated, the tubular portions 38, 40 are substantially rectangular in cross sectional configuration, and have spaced-apart and opposed sharp longitudinal edge portions 44, 46 which are offset laterally or horizontally from the connecting rib portion 42 for the purpose of gripping and clamping between them a connector fitting as will be described in detail below.

The connecting web 42 and the adjacent walls of the tubular portions 38, 40 are seen to constitute a channel-like formation comprised of three surfaces disposed, as shown, at right angles to each other and adapted for engagement by three cooperable surfaces of the associated collector shoe 48 illustrated in broken outline in FIG. 2. It will be seen from an inspection of this figure that the collector shoes 48 extend horizontally and are horizontally received by the slots 30 of the jackets 20 and the grooves 36 of the inner members 34. Considering again FIG. 6, the groove 36 is seen to be slightly narrower than the slot 30 whereby a collector shoe 48 may not only engage the inner or bottom wall of the groove 36 (that is, the connector web 42) but also either the upper wall or the lower wall of said groove, and this is an important aspect of the invention. The beads 32 of the outer insulating jacket 20 provide an increased amount of insulation, representing an increased insulated distance to the metal member 34 from the exterior of the groove 30. Thus there is minimized the likelihood of accidental electrical contact to the inner member 34 by workmen or personnel.

The outer member or jacket 20 may be readily fabricated as a plastic extrusion, as will be readily understood when considering its cross sectional shape. The extrusion will normally be in the form of a straight strip. Also, the metal inner member 34 may be readily fabricated by well known metal rolling or other metal forming operations. Both the extrusion of the jacket 20 and the forming of the inner metal member 34 may be readily carried out by production equipment in an economical manner and at a high rate of production.

After the forming of the inner member 34 and outer member or jacket 20 the strips are readily assembled by telescoping the inner member in the outer member to provide the assemblage illustrated in FIG. 6. Preferably, as shown in FIG. 10, the jacket 20 is somewhat shorter than the inner member 34 whereby portions of the ends of the later are exposed for the purpose of effecting a joint between, and also electrical connections to, the conductor bars.

Instead of forming the jacket and conductor separately in the manner described above, the metal conductor may be formed first and thereafter coated or otherwise provided with external insulation to produce the generally tubular insulating jacket configuration.

Joining of the ends of the conductor bars is effected by means of a novel connector fitting 52, see FIGS. 8–12. The connector fitting 52 comprises a pair of spaced-apart channel-section portions 54, 56 and an integral joining web portion 58 disposed between the channel-section portions. The channel-section portions 54, 56 are adapted to fit within the rectangular portions 38, 40 respectively of the inner member 34, and preferably are initially formed so as to be sprung apart somewhat whereby the opposite legs thereof are slightly divergent. In consequence, when the connector fitting 22 is forced into the end of the inner member 34, the channel-section portions 54, 56 will be sprung into a closed position, resulting in a spring tight fit with good electrical contact between the parts. The sharp edges 44, 46 of the inner member 34 forcibly engage and exert continuous pressure on the connector fitting 52 adjacent the sides of the web 58 thereof providing additional contact area and mechanical support. Thus there is insured an electrical connection of relatively high conductivity.

The connector fitting 52 is preferably formed of spring Phosphor bronze or other conductive material having considerable resilience. The end portions of the inner conductor members 34 of the bars have short transverse slots 60 adapted to receive locking tabs or fingers 62 struck out from the web portion 58 of the connector fitting 52. This is clearly illustrated in FIGS. 10 and 11, and by such construction the joining ends of the inner members 34 are locked against separation and reliably secured to each other by the connector fitting 52.

As seen in FIG. 14, a power feed wire 64 having a lug 66 may be secured by means of a bolt 68 to the connector fitting 52 for the purpose of supplying current thereto. The joint as illustrated in FIG. 11 may be provided with an insulating cover 70. FIGS. 13 and 14, formed of extruded polyvinyl chloride. The joint cover 70 has a somewhat rectangular cross-sectional configuration, with a bottom or back wall 72, side walls 74, and angularly disposed front walls 76. The cover piece 70 is adapted to be slid over the joint and to snugly fit thereto. The side walls 74 have indented portions 78 which occupy spaces between the end portions of the jacket 20, thereby to prevent accidental dislodgement of the cover. The front wall portion 76 of the cover piece comprises shoulder portions 80, 82 between which there are received the beads 32 of the jacket 20. Accordingly, the cover piece 70 has a nesting fit with the insulating jackets 20, as clearly seen in FIG. 12 wherein the cover piece 70 is indicated by a broken outline. Where a power connection is to be made in the joint between the conductor bars, as illustrated in FIG. 14, the cover piece 70 has a suitable hole to provide clearance for the securing bolt 68, as will be understood.

If it is desired to increase the current-carrying capacity of the conductor bars, in accordance with the invention, an elongate auxiliary metal current-carrying strip 84, FIG. 7, having sloped upper and lower edges 86, 88 respectively is wedged between the sharp edges 44, 46 of the tubular formations 38, 40 of the inner member 34. Such auxiliary strip can thus be forcibly held in engagement with the web portion 42 of the inner member 34, and will have continuous force exerted on it by the sharp edges 44, 46, insuring an effective electrical contact at all points along the inner member 34.

As seen in FIGS. 2 and 4, the collector shoes 48 normally engage the bottom sides of the grooves 36 of the inner members 34, as well as the inner walls 42 of the grooves. If desired, the collector shoes 48 may be sprung upwardly to engage the upper side walls of the grooves 36 instead of the lower side walls. Such arrangement would be used where the conductor bars are located in a dusty or dirty environment, tending to deposit dust and dirt on the lower side walls, and this is an important advantage of the present invention.

FIG. 2 shows the vertical stacking of three conductor bars as provided by the invention, such bars being individually held by U-shaped clamps 90 which are drawn closed by a single long common bolt 92. The central clamp 90 may have a mounting bolt 94 as shown. With this arrangement a very compact assemblage is had, providing for side or horizontal entry of the collector shoes 48.

An arrangement comprising an assemblage of four conductor bars is illustrated in FIG. 4, wherein a hanger or supporting piece 96 of rectangular configuration has side walls 98 carrying clamping members 100 by means of screws 102, said side walls also having clamping flanges 104 at their lower portions. The four conductor bars carried by the hanger 96 provide for side or horizontal entry of the collector shoes 48, and the collector head 106 and the shoes 48 are disposed between or inside of the stacked pairs.

An arrangement wherein the collector shoes are disposed exteriorly of the stacked pairs is illustrated in FIG. 5, wherein U-shaped clamps 108, 110 secure the conductor bars by means of screws 112. The clamp 108 is carried by a hanger plate 114 having flanges 116, and is secured by a bolt 118. With such an arrangement, the collector shoes are inserted horizontally, but at opposite exterior sides of the assemblage of conductor bars.

It will be further understood that the improved conductor bar of the present invention, having a side entry for the collector shoe, is adapted to support the shoe and collector head, as can be understood from an inspection of FIGS. 2 and 4.

In place of the assemblage of three conductor bars as illustrated in FIG. 2, or four conductor bars as illustrated in FIGS. 4 and 5, other arrangements are possible comprising only two conductor bars, as will be understood. Or, in FIGS. 4 and 5, one conductor bar may be omitted, leaving a resultant assemblage of three conductor bars, in various arrangements.

It will be understood from the foregoing that I have provided a novel and improved conductor bar section for trolley systems and the like, together with unique joint or connector means and various assemblages of multiple bars, all having distinct and important features and advantages as pointed out above in detail. The structures are simple and economical to fabricate while at the same time being sturdy and rugged, whereby the likelihood of failure or wear is minimized, and servicing is reduced.

Variations and modifications may be made within the scope of the invention, and portions of the improvement may be used without others.

I claim:
1. A conductor bar section for trolley systems and the like, comprising in combination:
   (a) an outer jacket member of insulating material, constituted of a semi-closed elongate hollow strip of elongate cross-sectional configuration, having a pair of essentially broader, mutually opposite sides and a remaining pair of narrower, mutually opposite sides, said strip further having a continuous longitudinal slot extending centrally along one of said broader sides,
   (b) an elongate inner conducting member of formed sheet metal disposed in and fitted to said strip and having a continuous-surfaced broad side, all portions of which are integral with each other, said broad side having an inwardly offset, central, longitudinally-extending portion in the form of a relatively deep channel of substantially rectangular section, said inwardly offset portion providing in said broad side a longitudinal groove which is aligned with the slot of the strip and said offset portion being characterized by a bottom contactor wall and a pair of opposed side contactor walls,
   (c) said inner conducting member having a cross-sectional shape of substantially elongate configuration with the narrower and the broader sides of the inner member generally juxtaposed to and extending along the narrower and broader sides respectively of the outer member whereby the assembled inner and outer members are generally closely fitted to each other and capable as an assemblage of being readily flexed about an axis normal to the members and to said narrower sides of the outer strip,
   (d) said opposed side contactor walls being not less substantially in width than the bottom contactor wall whereby the groove of the inner metal conducting member has appreciable relative depth and is adapted to establish effective conductive electrical contact with side walls of a collector shoe travelling in said groove,
   (e) the distance between the side contactor walls of said groove being less than the width of the slot of the jacket member whereby the jacket member will not interfere with said side electrical contact between the travelling collector shoe and side walls.

2. A conductor bar section as in claim 1, wherein:
 (a) the outer and inner members are of substantially rectangular overall configuration in cross section.

3. A conductor bar section as in claim 2, wherein:
 (a) the outer member has outwardly projected longitudinal beads located at the edges of the longitudinal slot thereof, providing thickened edges at said slot to minimize the likelihood of accidental electrical contact with the inner member.

4. A conductor bar section as in claim 3, and further including:
 (a) a substantially tubular cover of insulating material, adapted to slide over an end portion of the outer member, said tubular cover having a longitudinal slot and having interior longitudinal shoulders engageable with the longitudinal beads of the outer member.

5. A conductor bar section as in claim 1, wherein:
 (a) the inner member comprises two spaced apart, parallel substantially tubular portions and a connecting web portion extending between and joining said tubular portions, the space between said tubular portions comprising the longitudinal groove of the inner member, the wall of said connecting web portion and walls of said tubular portions together constituting the continuous-surfaced broad side of the inner conducting member.

6. A conductor bar section as in claim 5, wherein:
 (a) the tubular portions are of substantially square cross-sectional shape,
 (b) said connecting web and adjacent walls of the tubular portions constituting said inwardly offset portion of the inner member and having rectangular channel-like formation comprised of three relatively angularly disposed surfaces engageable by three cooperable surfaces of the collector shoe.

7. A conductor bar section as in claim 5, and further including:
 (a) a connector fitting fitted into the inner member and comprising a pair of spaced-apart channel-section portions and a joining web portion disposed between the channel-section portions,
 (b) said channel-section portions closely fitting within the tubular portions of the inner member.

8. A conductor bar section as in claim 1, and further including:
 (a) stiffening means on the inner conducting member, extending laterally of the same in opposite directions from the groove thereof, to minimize twisting and distortion of the bar section when it is being bent along a curve.

9. A conductor bar section for trolley systems and the like, comprising in combination:
 (a) an outer jacket member of insulating material, constituted of a semi-closed elongate hollow strip of elongate cross-sectional configuration, having a pair of essentially broader, mutually opposite sides and a remaining pair of narrower, mutually opposite sides, said strip further having a continuous longitudinal slot extending centrally along one of said broader sides,
 (b) an elongate inner conducting member of metal disposed in and fitted to said strip and having a longitudinal groove aligned with the slot of the strip, said groove having a bottom contactor wall and a pair of opposed side contactor walls,
 (c) said inner conducting member having a cross-sectional shape of substantially elongate configuration with the narrower and the broader sides of the inner member generally juxtaposed to and extending along the narrower and broader sides respectively of the outer member whereby the assembled inner and outer members are generally closely fitted to each other and capable as an assemblage of being readily flexed about an axis normal to the members and to said narrower sides of the outer strip, wherein the improvement comprises:
 (d) said opposed side contactor walls being commensurate in width with the bottom contactor wall whereby the groove of the inner metal conducting member has appreciable depth and is adapted to establish effective conductive electrical contact with side walls of a collector shoe travelling in said groove,
 (e) the distance between the side contactor walls of said groove being less than the width of the slot of the jacket member whereby the jacket member will not interfere with said side electrical contact between the travelling collector shoe and side walls,
 (f) said inner member comprising two spaced apart, parallel substantially tubular portions and a connecting web portion extending between and joining said tubular portions, the space between said tubular portions comprising the longitudinal groove of the inner member,
 (g) the tubular portions of the inner member having spaced-apart and opposed sharp longitudinal edge portions which are off-set laterally from said connecting web portion, and
 (h) an auxiliary metal current-carrying strip carried by said inner member and engaged with said web portion and sharp edge portions, said strip being maintained under continuous force from the edge portions to hold it in place and to make good contact therewith.

10. A conductor bar section as in claim 9, wherein:
 (a) the auxiliary strip has a wedge-shaped cross section with opposite sloped surfaces engaged with said sharp edge portions.

11. A conductor bar section for trolley systems and the like, comprising in combination:
 (a) an outer jacket member of insulating material, constituted of a semi-closed elongate hollow strip of elongate cross-sectional configuration, having a pair of essentially broader, mutually opposite sides and a remaining pair of narrower, mutually opposite sides, said strip further having a continuous longitudinal slot extending centrally along one of said broader sides,
 (b) an elongate inner conducting member of metal disposed in and fitted to said strip and having a longitudinal groove aligned with the slot of the strip, said groove having a bottom contactor wall and a pair of opposite side contactor walls,
 (c) said inner conducting member having a cross-sectional shape of substantially elongate configuration with the narrower and the broader sides of the inner member generally juxtaposed to and extending along the narrower and broader sides respectively of the outer member whereby the assembled inner and outer members are generally closely fitted to each other and capable as an assemblage of being readily flexed about an axis normal to the members and to said narrower sides of the outer strip, wherein the improvement comprises:
 (d) said opposed side contactor walls being commensurate in width with the bottom contactor wall whereby the groove of the inner metal conducting member has appreciable depth and is adapted to establish effective conductive electrical contact with side walls of a collector shoe travelling in said groove,
 (e) the distance between the side contactor walls of said groove being less than the width of the slot of the jacket member whereby the jacket member will not interfere with said side electrical contact between the travelling collector shoe and side walls,
 (f) the inner member comprising two spaced apart, parallel substantially tubular portions and a connecting web portion extending between and joining said tubular portions, the space between said tubular portions comprising the longitudinal groove of the inner member, (g) a connector fitting fitted into the inner member and comprising a pair of spaced-apart channel-section portions and a joining web portion disposed between the channel-section portions, (h) said channel-section portions closely fitting within the tubular portions of the inner member, (i) the tubular portions of the inner member having spaced-apart and opposed sharp longitudinal edge portions which are offset laterally from said connecting web portion, (j) said sharp edge portions applying continual force to the joining web portion of the connector fitting.

12. A conductor bar section for trolley systems and the like, comprising in combination:

(a) an outer jacket member of insulating material, constituted of a semi-closed elongate hollow strip of elongate, cross-sectional configuration, having a pair of essentially broader, mutually opposite sides and a remaining pair of narrower, mutually opposite sides, said strip further having a continuous longitudinal slot extending centrally along one of said broader sides, (b) an elongate inner conducting member of metal disposed in and fitted to said strip and having a longitudinal groove aligned with the slot of the strip, said groove having a bottom contactor wall and a pair of opposed side contactor walls, (c) said inner conducting member having a cross-sectional shape of substantially elongate configuration with the narrower and the broader sides of the inner member generally juxtaposed to and extending along the narrower and broader sides respectively of the outer member whereby the assembled inner and outer members are generally closely fitted to each other and capable as an assemblage of being readily flexed about an axis normal to the members and to said narrower sides of the outer strip, wherein the improvement comprises:

(d) said opposed side contactor walls being commensurate in width with the bottom contactor wall whereby the groove of the inner metal conducting member has appreciable depth and is adapted to establish effective conductive electrical contact with side walls of a collector shoe travelling in said groove, (e) the distance between the side contactor walls of said groove, being less than the width of the slot of the jacket member whereby the jacket member will not interfere with said side electrical contact between the travelling collector shoe and side walls, (f) the inner member comprising two spaced apart, parallel substantially tubular portions and a connecting web portion extending between and joining said tubular portions, the space between said tubular portions comprising the longitudinal groove of the inner member, (g) a connector fitting fitted into the inner member and comprising a pair of spaced-apart channel-section portions and a joining web portion disposed between the channel-section portions, (h) channel-section portions closely fitting within the tubular portions of the inner member, (i) the joining web-portion of the connector fitting having a projecting finger lanced from it and engaged with the connecting web portion of the inner member to lock the fitting to said member.

13. A conductor bar section for trolley systems and the like, comprising in combination:

(a) an outer jacket member of insulating material, constituted of a semi-closed elongate hollow strip of elongate cross-sectional configuration, having a pair of essentially broader, mutually opposite sides and a remaining pair of narrower, mutually opposite sides, said strip further having a continuous longitudinal slot extending centrally along one of said broader sides, (b) an elongate inner conducting member of metal disposed in and fitted to said strip and having a longitudinal groove aligned with the slot of the strip, said groove having a bottom contactor wall and a pair of opposed side contactor walls, (c) said inner conducting member having a cross-sectional shape of substantially elongate configuration with the narrower and the broader sides of the inner member generally juxtaposed to and extending along the narrower and broader sides respectively of the outer member whereby the assembled inner and outer members are genrally closely fitted to each other and capable as an assemblage of being readily flexed about an axis normal to the members and to said narrower sides of the outer strip, wherein the improvement comprises:

(d) said opposed side contactor walls being commensurate in width with the bottom contactor wall whereby the groove of the inner metal conducting member has appreciable depth and is adapted to establish effective conductive electrical contact with side walls of a collector shoe travelling in said groove, (e) the distance between the side contactor walls of said groove being less than the width of the slot of the jacket member whereby the jacket member will not interfere with said side electrical contact between the travelling collector shoe and side walls, (f) the inner member comprising two spaced apart, parallel substantially tubular portions and a connecting web portion extending between and joining said tubular portions, the space between said tubular portions comprising the longitudinal groove of the inner member, (g) a connector fitting fitted into the inner member and comprising a pair of spaced-apart channel-section portions and a joining web portion disposed between the channel-section portions, (h) said channel-section portions closely fitting within the tubular portions of the inner member, (i) the channel-section portions being sprung so as to have a divergent configuration when unrestricted, and being forced to more closed positions by the tubular portions of the inner member whereby forces constantly exist therebetween to improve the electrical conductivity.

14. A conductor bar section for trolley systems and the like, comprising in combination:

(a) an outer jacket member of insulating material, constituted of a semi-closed elongate hollow strip of elongate cross-sectional configuration, having a pair of essentially broader, mutually opposite sides and a remaining pair of narrower, mutually opposite sides, said strip further having a continuous longitudinal slot extending centrally along one of said broader sides, (b) an elongate inner conducting member of metal disposed in and fitted to said strip and having a longitudinal groove aligned with the slot of the strip, said groove having a bottom contactor wall and a pair of opposed side contactor walls, (c) said inner conducting member having a cross-sectional shape of substantially elongate configuration with the narrower and the broader sides of the inner member generally juxtaposed to and extending along the narrower and broader sides respectively of the outer member whereby the assembled inner and outer members are generally closely fitted to each other and capable as an assemblage of being readily flexed about an axis normal to the members and to said narrower sides of the outer strip, wherein the improvement comprises:
(d) said opposed side contactor walls being commensurate in width with the bottom contactor wall whereby the groove of the inner metal conducting member has appreciable depth and is adapted to establish effective conductive electrical contact with side walls of a collector shoe travelling in said groove,
(e) the distance between the side contactor walls of said groove being less than the width of the slot of the jacket member whereby the jacket member will not interfere with said side electrical contact between the travelling collector shoe and side walls,
(f) stiffening means on the inner conducting member, extending laterally of the same in opposite directions from the groove thereof, to minimize twisting and distortion of the bar section when it is being bent along a curve,
(g) said stiffening means comprising two spaced-apart portions of formed cross-sectional shape integral with the inner member.

15. A conductor bar section as in claim 14, wherein:
(a) the portions of formed cross-sectional shape which constitute the stiffening means, have a channel-like cross-sectional configuration.

References Cited
UNITED STATES PATENTS

| | | |
|---|---|---|
| 1,869,145 | 7/1932 | Greis. |
| 2,481,194 | 9/1949 | Bubb et al. _____ 191—35 |
| 2,675,434 | 4/1954 | Herrmann _____ 191—23 |
| 2,912,526 | 11/1959 | Herrmann _____ 191—23 |
| 2,994,734 | 8/1961 | Scofield et al. |

ARTHUR L. LA POINT, Primary Examiner

G. H. LIBMAN, Assistant Examiner